US012627225B2

(12) United States Patent
Liang et al.

(10) Patent No.: US 12,627,225 B2
(45) Date of Patent: ***May 12, 2026

(54) SWITCHED CAPACITOR CONVERTER

(71) Applicant: Southchip Semiconductor Technology (Shanghai) Co., Ltd., Shanghai (CN)

(72) Inventors: Xing Liang, Shanghai (CN); Wei Zhao, Shanghai (CN)

(73) Assignee: Southchip Semiconductor Technology (Shanghai) Co., Ltd., Shanghai (CN)

( * ) Notice: Subject to any disclaimer, the term of this patent is extended or adjusted under 35 U.S.C. 154(b) by 407 days.

This patent is subject to a terminal disclaimer.

(21) Appl. No.: 17/984,264

(22) Filed: Nov. 10, 2022

(65) Prior Publication Data

US 2023/0155491 A1     May 18, 2023

(30) Foreign Application Priority Data

Nov. 12, 2021     (CN) .......................... 202111337101.4

(51) Int. Cl.
  H02M 3/07       (2006.01)
  H02M 1/00       (2006.01)
  H02M 3/158      (2006.01)
(52) U.S. Cl.
  CPC ........... H02M 3/07 (2013.01); H02M 1/0054 (2021.05); H02M 3/1582 (2013.01)

(58) Field of Classification Search
  CPC ............................................... H02M 3/07–078
  See application file for complete search history.

(56) References Cited

U.S. PATENT DOCUMENTS

| | | | | |
|---|---|---|---|---|
| 10,224,803 B1* | 3/2019 | Rainer | .................... | H02M 3/07 |
| 12,301,108 B2* | 5/2025 | Liang | ...................... | H02M 3/07 |
| 2022/0263410 A1* | 8/2022 | Saggini | .................. | H02M 3/07 |
| 2023/0134427 A1* | 5/2023 | Liu | ..................... | H02M 1/0043 |
| | | | | 323/271 |
| 2024/0275278 A1* | 8/2024 | Liu | ......................... | H02M 1/12 |
| 2026/0005606 A1* | 1/2026 | Zhao | ....................... | H02M 3/07 |

FOREIGN PATENT DOCUMENTS

| | | |
|---|---|---|
| CN | 110165892 | 8/2019 |
| CN | 110729888 | 11/2020 |
| CN | 114070041 | 2/2022 |

* cited by examiner

*Primary Examiner* — Peter M Novak

(57) ABSTRACT

A switched capacitor converter includes an auxiliary circuit and two branches, the auxiliary circuit is connected between the two branches, the auxiliary circuit transfers an electric charge or electric charges on one branch to another branch of the two branches during a dead time when all primary power transistors of the two branches are turned off, so as to realize the primary power transistors are turned on at a zero voltage and reduce a switching loss. Therefore, the switched capacitor converter reduces the switching loss and improves efficiency.

20 Claims, 9 Drawing Sheets

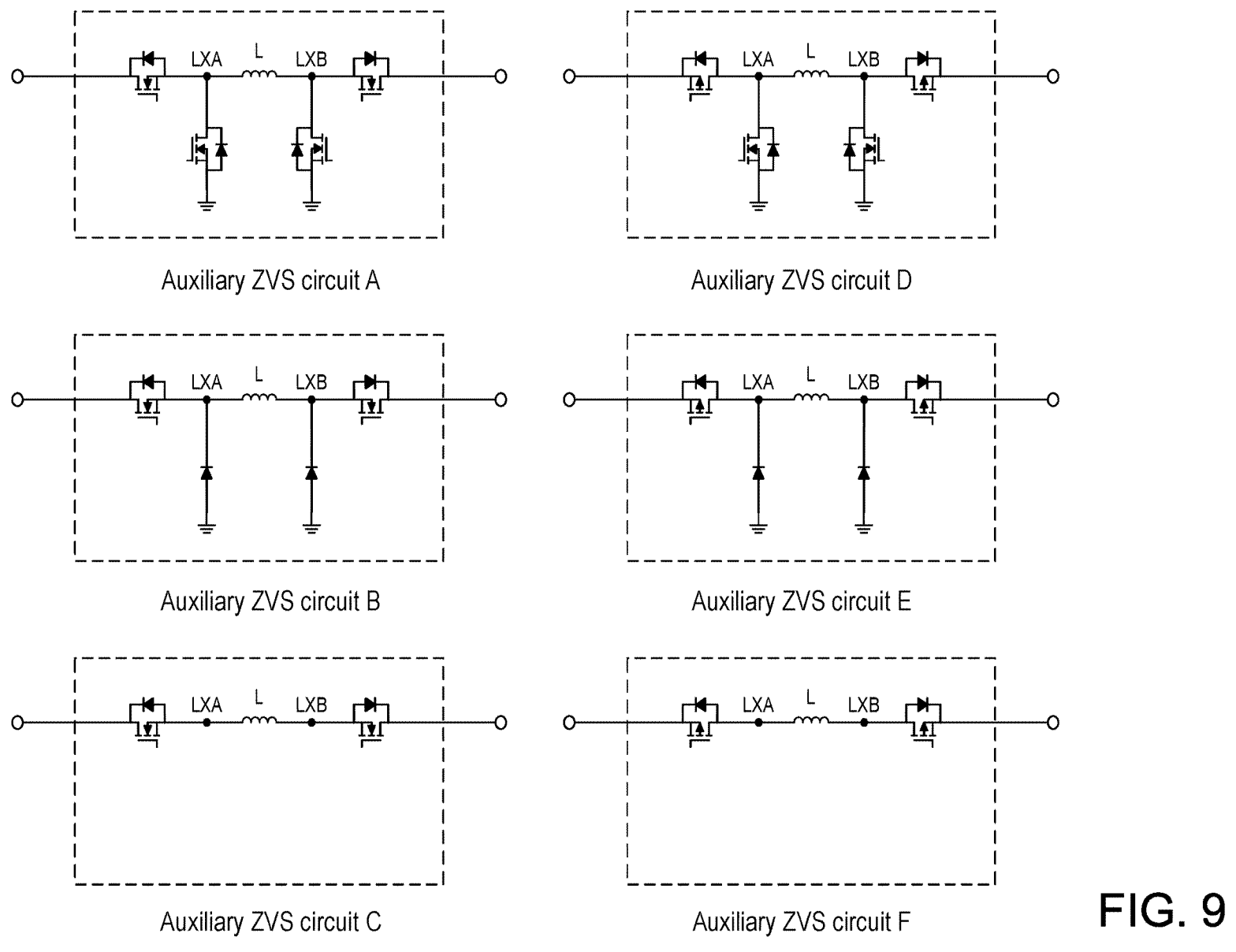

Auxiliary ZVS circuit A

Auxiliary ZVS circuit B

Auxiliary ZVS circuit C

Auxiliary ZVS circuit D

Auxiliary ZVS circuit E

Auxiliary ZVS circuit F

FIG. 9

SWITCHED CAPACITOR CONVERTER

CROSS-REFERENCE TO RELATED APPLICATION

This application claims the priority benefit of Chinese application serial no. 202111337101.4, filed on Nov. 12, 2021. The entirety of the above-mentioned patent application is hereby incorporated by reference herein and made a part of this specification.

BACKGROUND

Technical Field

The present application belongs to the field of switching power supply, and particularly relates to a switched capacitor converter.

Description of Related Art

Conventional inductive direct current-direct current (DC-DC) converters (for example, buck, boost, buck-boost, etc.) are widely used in 5G base station, server power supply, and mobile phone motherboard to achieve a conversion between different voltages. However, a conversion efficiency of the conventional inductive converter is generally inefficient due to large switching loss and inductive loss. In some applications, such as 5G communication with high power consumption and mobile phones with high power fast charging, the inductive converter requires higher conversion efficiency. Conventional inductive converters do not meet requirements of the conversion efficiency.

Since the energy density of capacitors is higher than that of inductors, the conversion efficiency of switched capacitor converters using capacitors for energy transmission is much higher than that of the inductive DC-DC converter, which are widely used in various high efficiency scenarios. And Dickson switched capacitor converters are widely used because of their low equivalent impedance.

As shown in FIG. 1, a conventional Dickson 4:1 switched capacitor converter includes eight power transistors (i.e., Q1, Q2, Q3, Q4, Q5, Q6, Q7 and Q8), three capacitors (i.e., C1, C2 and C3), an input capacitor CIN, an output capacitor COUT and an output load IOUT. The power transistor Q1, power transistor Q3, power transistor Q5 and power transistor Q7 are driven by a same control signal, and power transistor Q2, power transistor Q4, power transistor Q6 and power transistor Q8 are driven by a same control signal. Both control signals are square wave signals with 50% duty ratio, and have a complementary in waveform. The conventional Dickson 4:1 switched capacitor converter can realize that an output voltage VOUT is a quarter of an input voltage, i.e. VIN=4*VOUT. And voltage differences of the three capacitors are VC1=VOUT, VC2=2*VOUT, VC3=3*VOUT, respectively.

Although the conventional 4:1 Dickson switched capacitor converter do not have switching-off loss and inductive loss, it still needs to overcome two parasitic capacitors Cds and Cgd when the power transistor is turned on, therefore, there is a certain switching-on loss. For high voltage and low current applications, a ratio of switching-on loss is larger due to higher voltage differences of the two capacitors Cds and Cgd, which limits the further improvement of converter efficiency of the conventional 4:1 Dickson switched capacitor converter.

SUMMARY

The present application is directed to the above-mentioned problems, and a novel switched capacitor converter with zero voltage switching-on (ZVS) is proposed, all primary power transistors can turn on under the zero voltage by introducing an auxiliary circuit, thereby reducing switching loss. Furthermore, the ZVS switched capacitor converter may be N:1 ZVS switched capacitor converter, N is an integer greater than or equal to 2.

An aspect of the present application relates to a switched capacitor converter, including a first branch, a second branch, an auxiliary circuit, N common power transistors and N−1 capacitors, N is an integer greater than or equal to 3.

The first branch includes a first power transistor and a second power transistor, the second branch includes a third power transistor and a fourth power transistor, a first terminal of the second power transistor and a first terminal of the third power transistor are connected to an output terminal of the switched capacitor converter, a second terminal of the second power transistor is connected to a first terminal of the first power transistor via a first node, a second terminal of the third power transistor is connected to a first terminal of the fourth power transistor via a second node, and a second terminal of the first power transistor and a second terminal of the fourth power transistor are grounded.

An input terminal of the switched capacitor converter is connected to the output terminal of the switched capacitor converter via the N common power transistors which are connected in turn, each of the N−1 capacitors is corresponded to respective two adjacent common power transistors of the N common power transistors and is connected between the two adjacent common power transistors respectively, one of any two adjacent capacitors of the N−1 capacitors is connected to the first node, and another of the two adjacent capacitors is connected to the second node.

Both terminals of the auxiliary circuit is connected to the first node and the second node respectively, the first power transistor, the second power transistor, the third power transistor, the fourth power transistor and the N common power transistors are primary power transistors, and the auxiliary circuit is configured to transfer an electric charge or electric charges on one of the first node and the second node to another of the first node and the second node during a dead time when all the primary power transistors are turned off, so that a voltage difference at both terminals of each of the primary power transistors become zero, then the primary power transistors are turned on under zero voltage.

In embodiment of the present application, the N=4, the N common power transistors comprise a fifth power transistor, a sixth power transistor, a seventh power transistor and an eighth power transistor, and the N−1 capacitors comprise a first capacitor, a second capacitor and a third capacitor.

A first terminal of the eighth power transistor is the input terminal of the switched capacitor converter, the input terminal is connected to an external input voltage, and a second terminal of the eighth power transistor is connected to a first terminal of the seventh power transistor and a first terminal of the third capacitor.

A second terminal of the seventh power transistor is connected to a first terminal of the second capacitor and a first terminal of the sixth power transistor.

A second terminal of the sixth power transistor is connected to a first terminal of the first capacitor and a first terminal of the fifth power transistor.

A second terminal of the fifth power transistor is connected to the first terminal of the second power transistor and the first terminal of the third power transistor, and the second terminal of the fifth power transistor is also connected to the output terminal of the switched capacitor converter.

A second terminal of the first capacitor and a second terminal of the third capacitor are connected to the first node, a second terminal of the second capacitor is connected to the second node.

In embodiment of the present application, the N common power transistors comprise a first common power transistor, a second common power transistor, . . . , a N–3-th common power transistor, a N–2-th common power transistor, a N–1-th common power transistor and a N–th common power transistor, and the N–1 capacitors comprise a first capacitor, a second capacitor, a third capacitor, . . . , and a N–1-th capacitor.

The input terminal of the switched capacitor converter is connected to the output terminal of the switched capacitor converter via the N-th common power transistor, the N–1-th common power transistor, the N–2-th common power transistor, the N–3-th common power transistor, . . . , the second common power transistor and the first common power transistor which are connected in turn respectively.

A first terminal of the first capacitor is connected between the first common power transistor and the second common power transistor, a second terminal of the first capacitor is connected to the first node, so M capacitors of the N–1 capacitors are connected to the first node, and N–M–1 capacitors of the N–1 capacitors are connected to the second node, M=N/2 when N is an even number, and M=(N–1)/2 when N is an odd number.

In embodiment of the present application, when N is an even number, the N–1-th capacitor is a 2M–1-th capacitor, a first terminal of the 2M–1-th capacitor is connected between the N-th common power transistor and the N–1-th common power transistor, and second terminals of the first capacitor, the third capacitor, . . . , and the 2M–1-th capacitor are connected to the first node respectively; and when N is an odd number, the N–1-th capacitor is a 2(N–M–1)-th capacitor, a first terminal of the 2(N–M–1)-th capacitor is connected between the N-th common power transistor and the N–1-th common power transistor, and second terminals of the second capacitor, . . . , and the 2(N–M–1)-th capacitor are connected to the second node respectively.

In embodiment of the present application, the auxiliary circuit includes a ninth power transistor, a tenth power transistor, an eleventh power transistor, a twelfth power transistor and an inductor; a first terminal of the ninth power transistor is connected to the first node of the first branch, a second terminal of the ninth power transistor is connected to a first terminal of the inductor and a first terminal of the tenth power transistor, and a second terminal of the tenth power transistor is grounded; and a second terminal of the inductor is connected to a first terminal of the eleventh power transistor and a first terminal of the twelfth power transistor, a second terminal of the eleventh power transistor is grounded, and a second terminal of the twelfth power transistor is connected to the second node of the second branch.

In embodiment of the present application, a working sequence of the 4:1 switched capacitor converter includes four stages as follows.

A first stage: the second power transistor, the fourth power transistor, the sixth power transistor, the eighth power transistor, the tenth power transistor and the twelfth power transistor are turned on, and remaining power transistors are turned off; the external input voltage is configured to supply power to a load via the third capacitor, and simultaneously the first capacitor and the second capacitor are connected in series to supply power to the load, and the first capacitor is in a charging state, the second capacitor is in a discharging state, the third capacitor is in the charging state, and a current on the inductor is zero.

A second stage: the ninth power transistor and the twelfth power transistor are turned on, and remaining power transistors are turned off, the current on the inductor increases and then decreases until to zero, and the second stage ends when the current on the inductor decreases to zero.

A third stage: the first power transistor, the third power transistor, the fifth power transistor, the seventh power transistor, the ninth power transistor and the eleventh power transistor are turned on, and remaining power transistors are turned off; the first capacitor supplies power to the load, the first capacitor is in the discharging state, the second capacitor and the third capacitor are connected in series to supply power to the load, the second capacitor is in the charging state, the third capacitor is in the discharging state, and the current on the inductor is 0.

A fourth stage: the ninth power transistor and the twelfth power transistor are turned on, and remaining power transistors are turned off; the current on the inductor increases and then decreases until to zero, and the fourth stage ends when the current on the inductor decreases to zero, and returning to the first stage.

In embodiment of the present application, the ninth power transistor, the tenth power transistor, the eleventh power transistor and the twelfth power transistor are N-type power transistors.

In embodiment of the present application, the ninth power transistor and the twelfth power transistor are P-type power transistors, and the tenth power transistor and the eleventh power transistor are N-type power transistors.

In embodiment of the present application, the auxiliary circuit includes a ninth power transistor, a tenth power transistor, a first diode, a second diode and an inductor; a first terminal of the ninth power transistor is connected to the first node of the first branch, a second terminal of the ninth power transistor is connected to a first terminal of the first diode and a first terminal of the inductor, a second terminal of the first diode is grounded, the first terminal of the first diode is a cathode, and the second terminal of the first diode is an anode; and a second terminal of the inductor is connected to a first terminal of the second diode and a first terminal of the tenth power transistor, a second terminal of the second diode is grounded, the first terminal of the second diode is a cathode, the second terminal of the second diode is an anode, and a second terminal of the tenth power transistor is connected to the second node of the second branch.

In embodiment of the present application, the auxiliary circuit includes a ninth power transistor, a tenth power transistor and an inductor; a first terminal of the ninth power transistor is connected to the first node of the first branch, and a second terminal of the ninth power transistor is connected to a first terminal of the inductor; and a second terminal of the inductor is connected to a first terminal of the tenth power transistor, and a second terminal of the tenth power transistor is connected to the second node of the second branch.

In embodiment of the present application, the ninth power transistor and the twelfth power transistor are N-type power transistors or P-type power transistors.

The above-mentioned solution is a control sequence, and there are, of course, other control sequences on the basis of the above-mentioned circuit structure.

Therefore, an auxiliary circuit are added between two nodes of two branches respectively of a conventional Dickson switched capacitor converter, the auxiliary circuit used to transfer electric charges at one branch to another branch during a dead time when all the primary power transistors are turned off, so as to realize the zero voltage switching on of all the primary power transistors and reduce the switching loss. The on-resistance of the added auxiliary power transistor is much larger than the on-resistance of the primary power transistor, and the inductance value of the auxiliary inductor is small and the package size and cost are also very low. Therefore, by adding the auxiliary circuit, the Dickson switched capacitor converter of embodiments of the present application can significantly reduce the switching loss of a switched capacitor converter, improve efficiency, and has good performance benefits and commercial prospects.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 2 is a schematic diagram of a circuit structure of a Dickson 4:1 switched capacitor converter of an embodiment of the present application.

FIG. 3 is a working sequence diagram of a 4:1 ZVS switched capacitor converter of an embodiment of the present application.

FIG. 6 is an equivalent circuit diagram of a 4:1 ZVS switched capacitor converter working in Stage 2 of an embodiment of the present application.

FIG. 9 is a schematic diagram showing the structures of various control auxiliary circuits of an embodiment of the present application.

DESCRIPTION OF THE EMBODIMENTS

Figure 1:
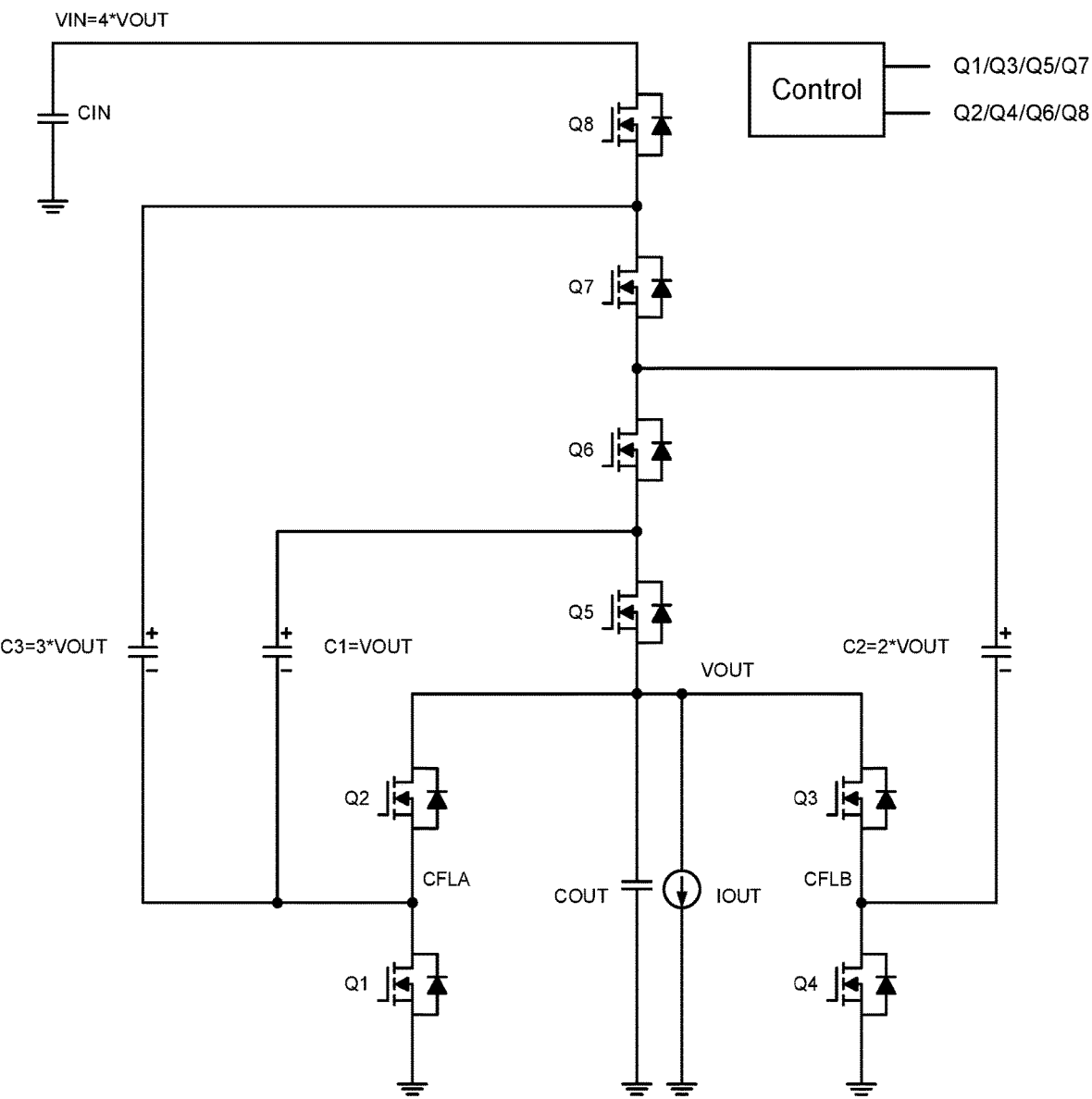
FIG. 1 is a schematic diagram showing a circuit structure of a conventional Dickson 4:1 switched capacitor converter.

To describe the technical solutions in embodiments of the present application more clearly, the following briefly describes the accompanying drawings required for describing the embodiments. It should be noted that, the embodiments of the present application and the features in the different embodiments may be combined with each other under the condition that they do not conflict with each other.

Figure 2:
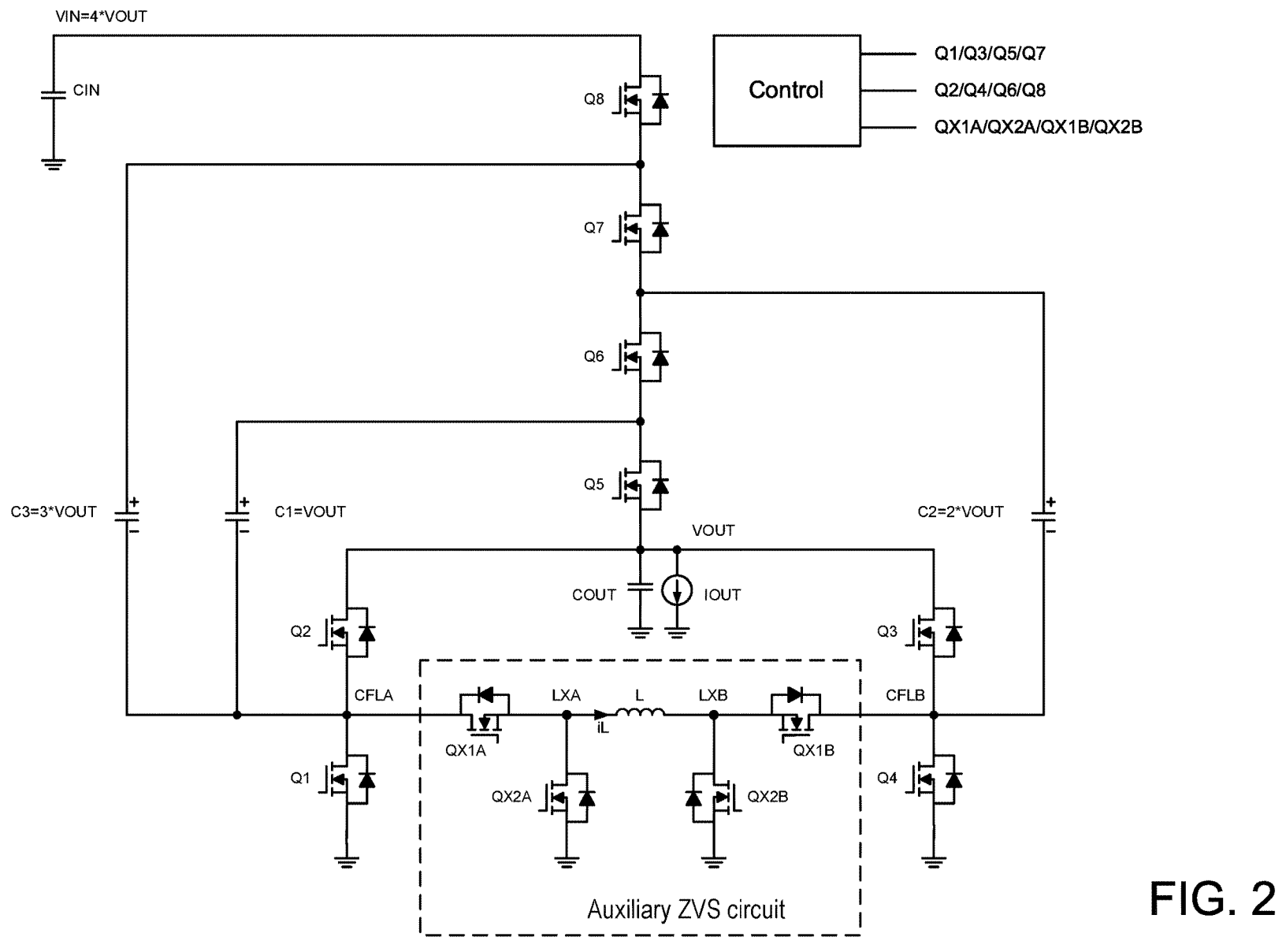

As shown in FIG. 2, a 4:1 Zero Voltage Switch (ZVS) switched capacitor converter of an embodiment of the present application includes a primary power circuit and an auxiliary ZVS circuit. The primary power circuit includes eight primary power transistors (i.e., a first power transistor Q1, a second power transistor Q2, a third power transistor Q3, a fourth power transistor Q4, a fifth power transistor Q5, a sixth power transistor Q6, a seventh power transistor Q7 and a eighth power transistor Q8), and three capacitors (i.e., a first capacitor C1, a second capacitor C2 and a third capacitor C3). The switched capacitor converter further includes an input capacitor CIN, an output capacitor COUT and an output load IOUT. The auxiliary circuit includes four auxiliary power transistors (i.e., a ninth power transistor QX1A, a tenth power transistor QX2A, a twelfth power transistor QX1B and an eleventh power transistor QX2B), and an inductor L.

A first branch includes the first power transistor Q1 and the second power transistor Q2, and the first power transistor Q1 and the second power transistor Q2 are connected via a first node CFLA; a second branch includes the third power transistor Q3 and the fourth power transistor Q4, and the third power transistor Q3 and the fourth power transistor Q4 are connected via a second CFLB. All power transistors in the first branch and the second branch are primary power transistors, and each primary power transistor has a parasitic capacitor.

A first terminal of the eighth power transistor Q8 is an input terminal of the switched capacitor converter, the input terminal of the switched capacitor converter is connected to an external input voltage, and a second terminal of the eighth power transistor Q8 is connected to a first terminal of the seventh power transistor Q7 and a first terminal of the third capacitor C3.

A second terminal of the seventh power transistor Q7 is connected to a first terminal of the second capacitor C2 and a first terminal of the sixth power transistor Q6.

A second terminal of the sixth power transistor Q6 is connected to a first terminal of the first capacitor C1 and a first terminal of the fifth power transistor Q5.

A second terminal of the fifth power transistor Q5 is connected to a first terminal of the second power transistor Q2 and a first terminal of the third power transistor Q3, and the second terminal of the fifth power transistor Q5, the first terminal of the second power transistor Q2 and the first terminal of the third power transistor Q3 are connected to an output terminal of the switched capacitor converter.

A second terminal of the second power transistor Q2 is connected to a second terminal of the third capacitor C3, a second terminal of the first capacitor C1 and a first terminal of the first power transistor Q1, and a second terminal of the first power transistor Q1 is grounded.

A second terminal of the third power transistor Q3 is connected to a second terminal of the second capacitor C2 and a first terminal of the fourth power transistor Q4, and a second terminal of the fourth power transistor Q4 is grounded.

The second terminal of the second power transistor Q2, the second terminal of the first capacitor C1, the second terminal of the third capacitor C3 and the first terminal of the first power transistor Q1 are connected to the first node CFLA of the first branch, and the second terminal of the third power transistor Q3, the second terminal of the second capacitor C2 and the first terminal of the fourth power transistor Q4 are connected to the second node CFLB of the second branch.

In a steady working state, VIN=4*VOUT, VC1=VOUT, VC2=2*VOUT, VC3=3*VOUT, VIN presents an input voltage, VOUT presents an output voltage, VC1 presents a voltage difference between both terminals of the first capacitor C1, VC2 presents a voltage difference between both terminals of the second capacitor C2, and VC3 presents a voltage difference between both terminals of the third capacitor C3.

Figure 3:
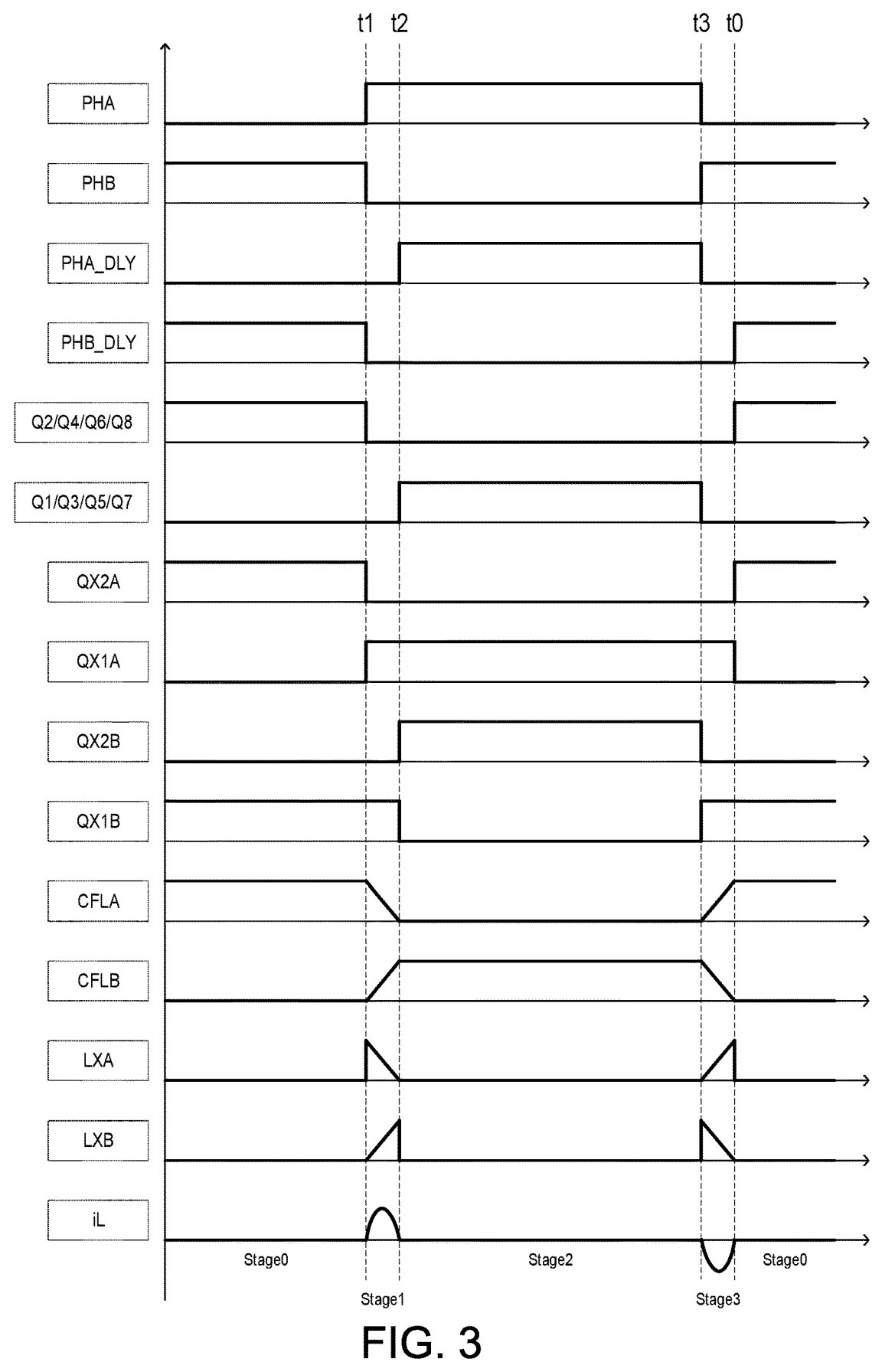

FIG. 3 shows a working sequence of the 4:1 ZVS switched capacitor converter in one switching cycle. There are four working states in sequence within one working cycle, namely stage 0, stage 1, stage 2 and stage 3. A signal PHA is an original clock signal with a 50% duty ratio, a signal PHB is an inverse signal of the signal PHA, a signal PHA_DLY is a clock signal obtained by the signal PHA passing a delay, and a signal PHB_DLY is a clock signal obtained by PHB passing a delay. Signal Q1, signal Q3, signal Q5 and signal Q7 present on-off states of the first power transistor Q1, the third power transistor Q3, the fifth power transistor Q5 and the seventh power transistor Q7 respectively, signal Q2, signal Q4, signal Q6 and signal Q8 present on-off states of the second power transistor Q2, the fourth power transistor Q4, the sixth power transistor Q6 and the eighth power transistor Q8 respectively, signal QX1A, signal QX2A, signal QX1B and signal QX2B present on-off states of the ninth power transistor QX1A, the tenth power transistor QX2A, the twelfth power transistor QX1B and the eleventh power transistor QX2B respectively, signal CFLA and signal CF LB present voltage waveforms of the first node CFLA and node CFLB respectively, signal LXA and signal LXB present voltage waveforms of the node LXA and node LXB respectively, and signal iL present a current waveform flowing through the inductor L.

Figure 4:
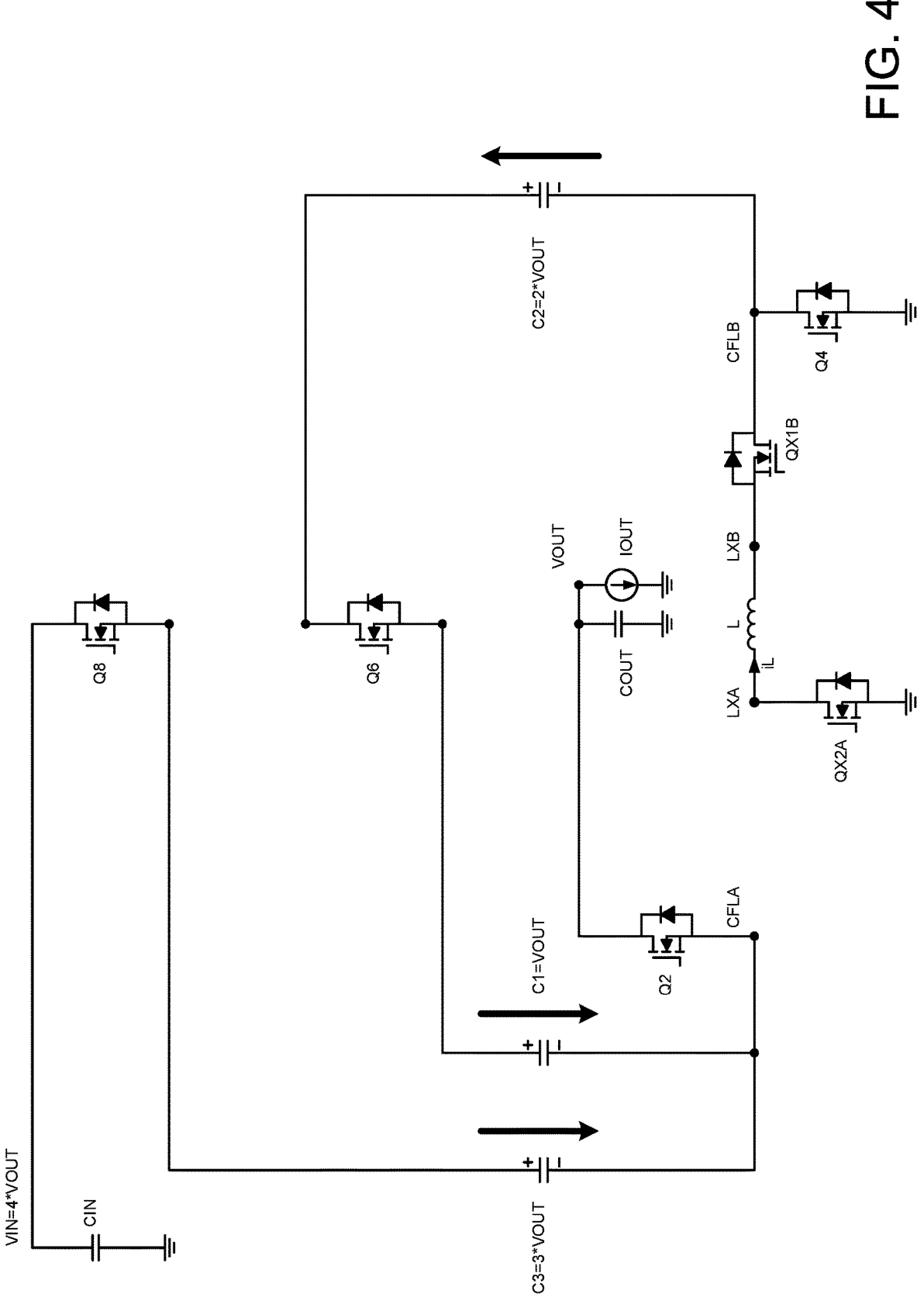
FIG. 4 is an equivalent circuit diagram of a 4:1 ZVS switched capacitor converter working in Stage 0 of an embodiment of the present application.

Stage 0 (t0-t1): As shown in FIG. 4, in stage 0, the second power transistor Q2, the fourth power transistor Q4, the sixth power transistor Q6 and the eighth power transistor Q8 are turned on, and the first power transistor Q1, the third power transistor Q3, the fifth power transistor Q5 and the seventh power transistor Q7 are turned off. The input voltage supplies power to the load via the third capacitor C3, while the first capacitor C1 and the second capacitor C2 are connected in series to supply power to the load. The first capacitor C1 is in charge state, the second capacitor C2 is in discharge state, and the third capacitor C3 is in charge state. In the auxiliary circuit, the twelfth power transistor QX1B and the tenth power transistor QX2A are turned on, and the ninth power transistor QX1A and the eleventh power transistor QX2B are turned off. In this stage, a voltage of the first node CFLA of the first branch is equal to the output voltage VOUT, a voltage of the second node CFLB of the second branch is zero, the voltage of the node LXA and the voltage of the node LXB are zero, and the current flowing through the inductor L is zero.

Figure 5:
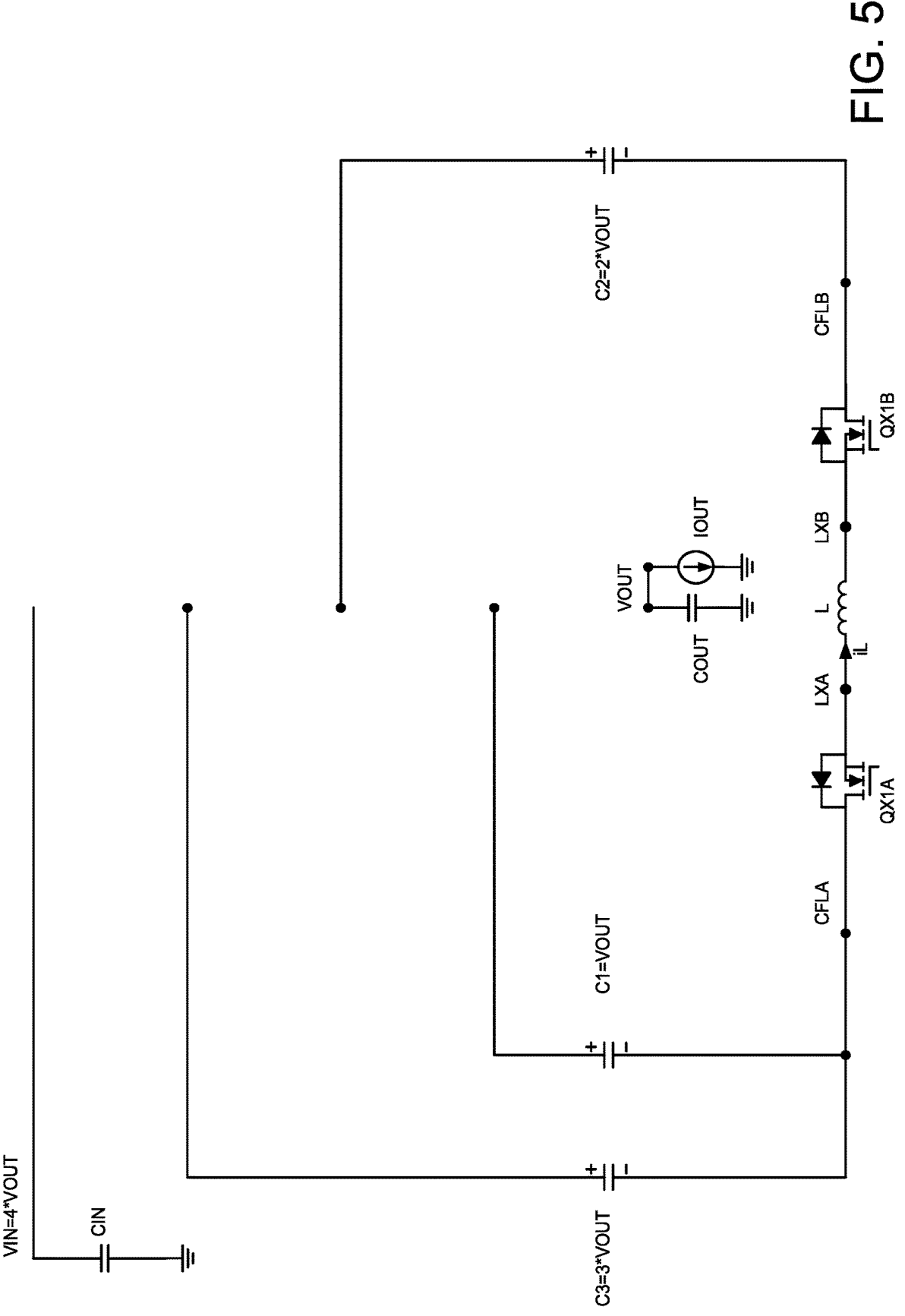
FIG. 5 is an equivalent circuit diagram of a 4:1 ZVS switched capacitor converter working in Stage 1 of an embodiment of the present application.

Stage 1 (t1-t2): As shown in FIG. 5, at the moment t1, the first power transistor Q1, the third power transistor Q3, the fifth power transistor Q5 and the seventh power transistor Q7 remain turning off, and the second power transistor Q2, the fourth power transistor Q4, the sixth power transistor Q6 and the eighth power transistor Q8 are turned off, therefore, all the eight primary power transistors are turned off. The first capacitor C1, the second capacitor C2 and the third capacitor C3 stop charging or discharging and maintain current voltage differences respectively. A current of the load is provided by the output capacitor COUT when discharging. The tenth power transistor QX2A is turned off, and the ninth power transistor QX1A and the twelfth power transistor QX1B are turned on.

Before the moment t1, the voltage of the first node CFLA of the first branch is VOUT, and the voltage of the second node CFLB of the second branch is zero. Begin from the moment t1, the inductor L is connected between the first node CFLA of the first branch and the second node CFLB of the second branch, a parasitic capacitor of the first node CFLA of the first branch, a parasitic capacitor of the second node CFLB of the second branch and the inductor L start to resonate. The voltage of the first node CFLA of the first branch syntonically decreases, the voltage of the second node CFLB of the second branch syntonically increases, and the current of the inductor L gradually increases. When the voltage of the first node CFLA of the first branch and the voltage of the second node CFLB of the second branch are equal, a current through the inductor L reaches a positive peak value. Then, the voltage of the first node CFLA of the first branch still continuously decreases, the voltage of the second node CFLB of the second branch still continuously increases, and the current of the inductor L begins to decrease. At the moment t2, the voltage of the first node CFLA of the first branch syntonically decreases to zero, the voltage of the second node CFLB of the second branch syntonically increases to the output voltage VOUT, and the current of the inductor L decreases to zero. Then, the stage 2 starts.

It can be seen that, in stage 1, the electric charges of the first node CFLA of the first branch can be transferred to the second node CFLB of the second branch by using the resonance between the inductor L and the parasitic capacitor. The condition of zero voltage switching on is thus provided for the first power transistor Q1, the third power transistor Q3, the fifth power transistor Q5 and the seventh power transistor Q7 to be turned on in the next stage.

Figure 6:
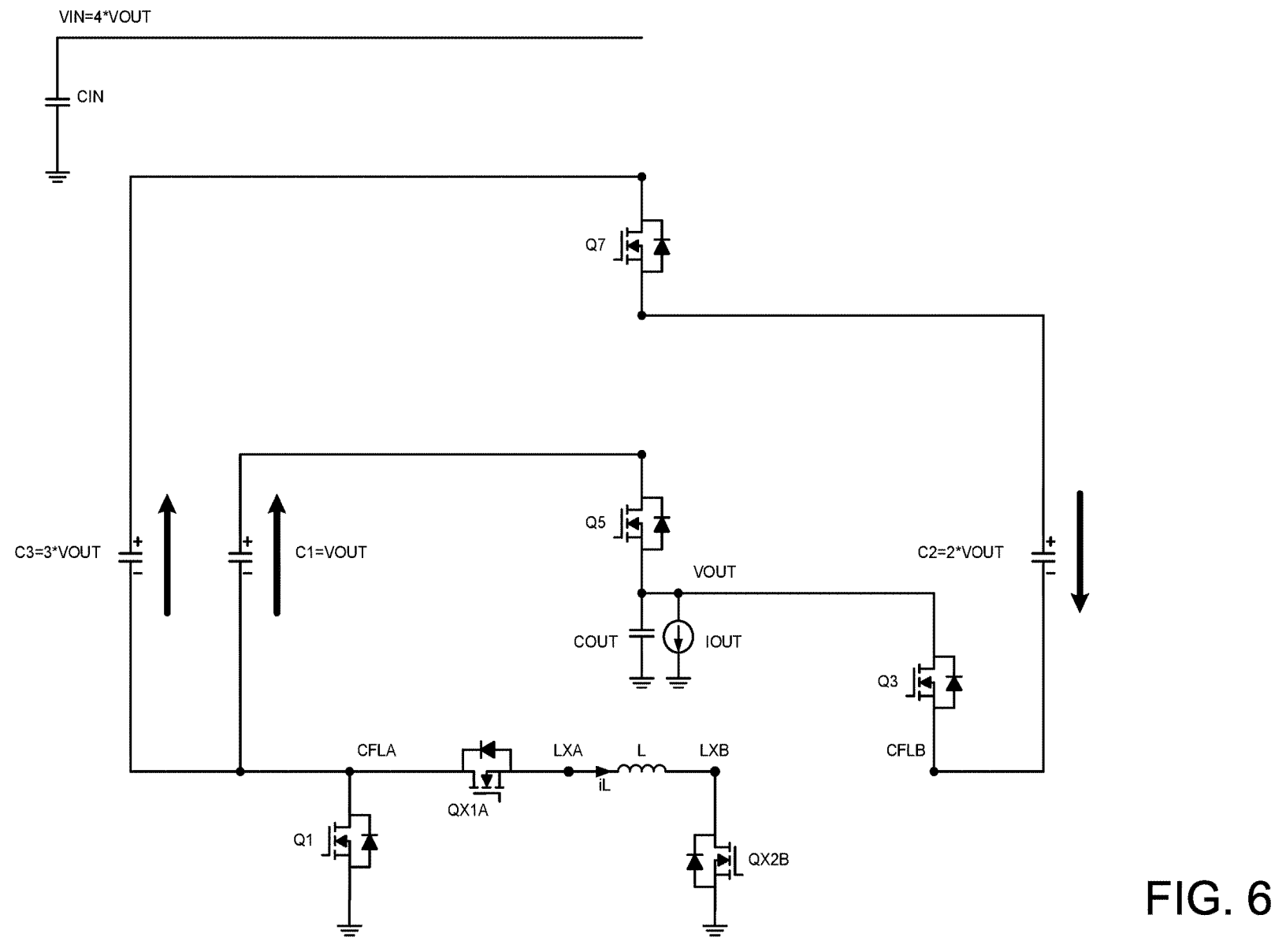

Stage 2 (t2-t3): As shown in FIG. 6, at the moment t2, the first power transistor Q1, the third power transistor Q3, the fifth power transistor Q5 and the seventh power transistor Q7 are turned on at zero voltage, and the second power transistor Q2, the fourth power transistor Q4, the sixth power transistor Q6 and the eighth power transistor Q8 remain turning off. The ninth power transistor QX1A and the eleventh power transistor QX2B are turned on, and the tenth power transistor QX2A and the twelfth power transistor QX1B are turned off. The first capacitor C1 is in discharge state and supplies power to the load, while the second capacitor C2 and the third capacitor C3 are connected in series to supply power to the load. The second capacitor C2 is in charge state, and the third capacitor C3 is in discharge state. The voltage of the first node CFLA of the first branch is zero, the voltage of the second node CFLB of the second branch is equal to the output voltage, the voltage of the node LXA and the voltage of the node LXB are zero, and the current flowing through the inductor L is zero.

Figure 7:
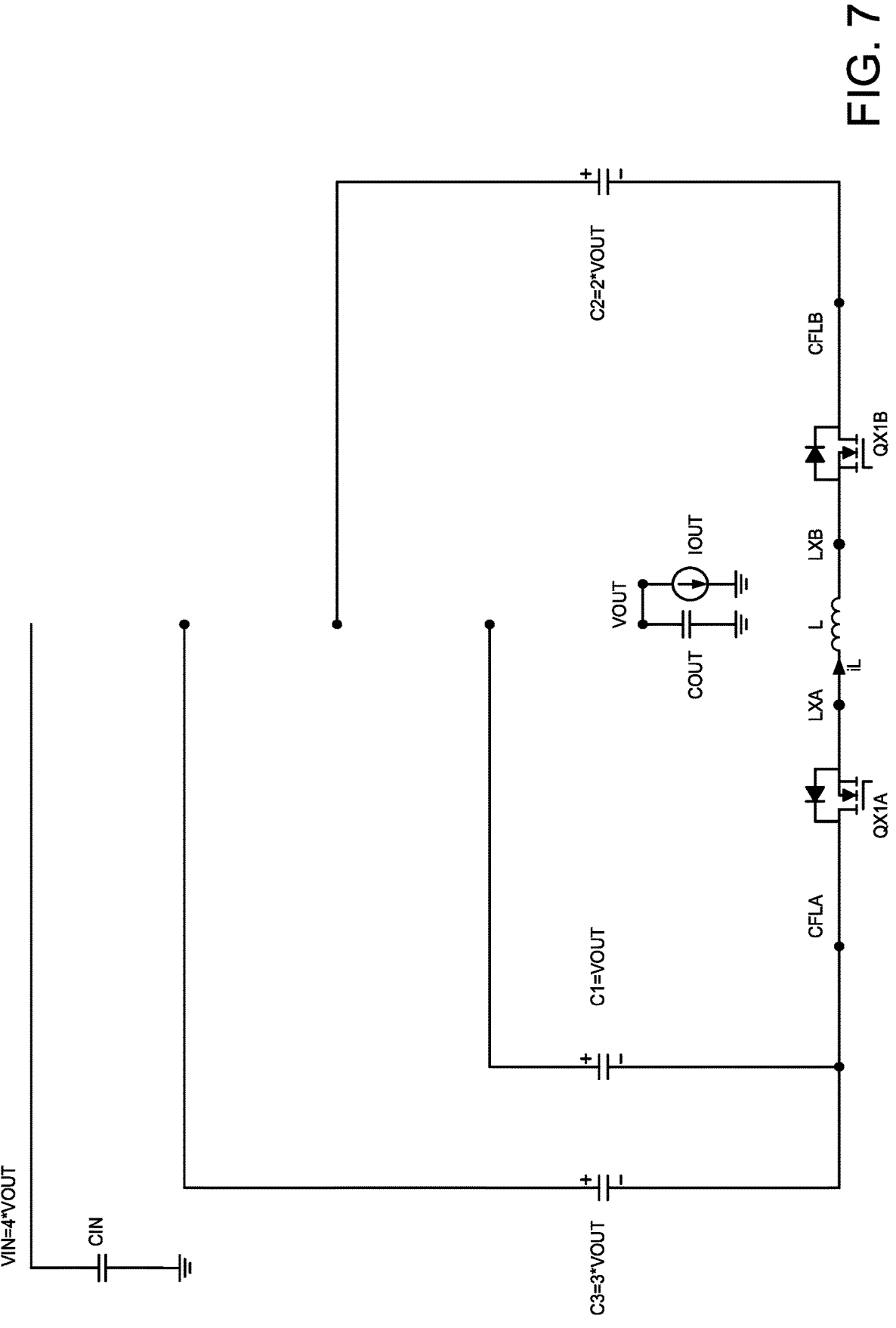
FIG. 7 is an equivalent circuit diagram of a 4:1 ZVS switched capacitor converter working in Stage 3 of an embodiment of the present application.

Stage 3 (t3-t0): As shown in FIG. 7, at the moment t3, the first power transistor Q1, the third power transistor Q3, the fifth power transistor Q5 and the seventh power transistor Q7 are turned off, and the second power transistor Q2, the fourth power transistor Q4, the sixth power transistor Q6 and the eighth power transistor Q8 remain turning off, therefore, all the eight primary power transistors are turned off. The first capacitor C1, the second capacitor C2 and the third capacitor C3 stop charging or discharging and maintain the current voltage respectively. The current of the load is provided by the output capacitor COUT when discharging. The tenth power transistor QX2A and the eleventh power transistor QX2B are turned off, and the ninth power transistor QX1A and the twelfth power transistor QX1B are turned on.

Before the moment t3, the voltage of the first node CFLA of the first branch is zero, and the voltage of the second node CFLB of the second branch is the output voltage VOUT. Begin from the moment t3, the inductor L is connected between the first node CFLA and the second node CFLB, then the parasitic capacitor of the first node CFLA of the first branch, the parasitic capacitor of the second node CFLB of the second branch and the inductor L start to resonate. The voltage of the first node CFLA of the first branch syntonically increases, the voltage of the second node CFLB of the second branch syntonically decreases, and the current of the inductor L gradually increases in negative direction. When the voltage of the first node CFLA of the first branch and the voltage of the second node CFLB of the second branch are equal, the current through the inductor reaches a negative peak value. Then, the voltage of the first node CFLA of the first branch still continuously increases, the voltage of the second node CFLB of the second branch still continuously decreases, and the current of the inductor L begins to decrease negatively. At the moment t0, the voltage of the first node CFLA of the first branch syntonically increases to the output voltage VOUT, the voltage of the second node CFLB of the second branch syntonically decreases to zero, and the current of the inductor L decreases to zero. At this point stage 0 is entered.

It can be seen that, the electric charges of the second node CFLB of the second branch can be transferred to the first node CFLA of the first branch by using the resonance between the inductor L and parasitic capacitance in stage 3. The condition of zero voltage switching on is thus provided for the second power transistor Q2, the fourth power transistor Q4, the sixth power transistor Q6 and the eighth power transistor Q8 to be turned on in the next stage.

According to the switched capacitor converter of the embodiments of the present application, by controlling the ninth power transistor QX1A, the tenth power transistor QX2A, the twelfth power transistor QX1B and the eleventh power transistor QX2B according to the above-mentioned control sequence, the electric charges on the first node CFLA of the first branch are transferred to the second node CFLB of the second branch via the inductor L in the stage 1, and the electric charges on the second node CFLB of the second branch are transferred to the first node CFLA of the first branch via the inductor L in the stage 3, so that a voltage difference of both terminals of each of the first power transistor Q1, the second power transistor Q2, the third power transistor Q3, the fourth power transistor Q4, the fifth power transistor Q5, the sixth power transistor Q6, the seventh power transistor Q7 and the eighth power transistor Q8 is zero before these power transistors are turned on respectively, which greatly reduces the switching loss and improves the conversion efficiency of the switched capacitor converter.

Figure 8:
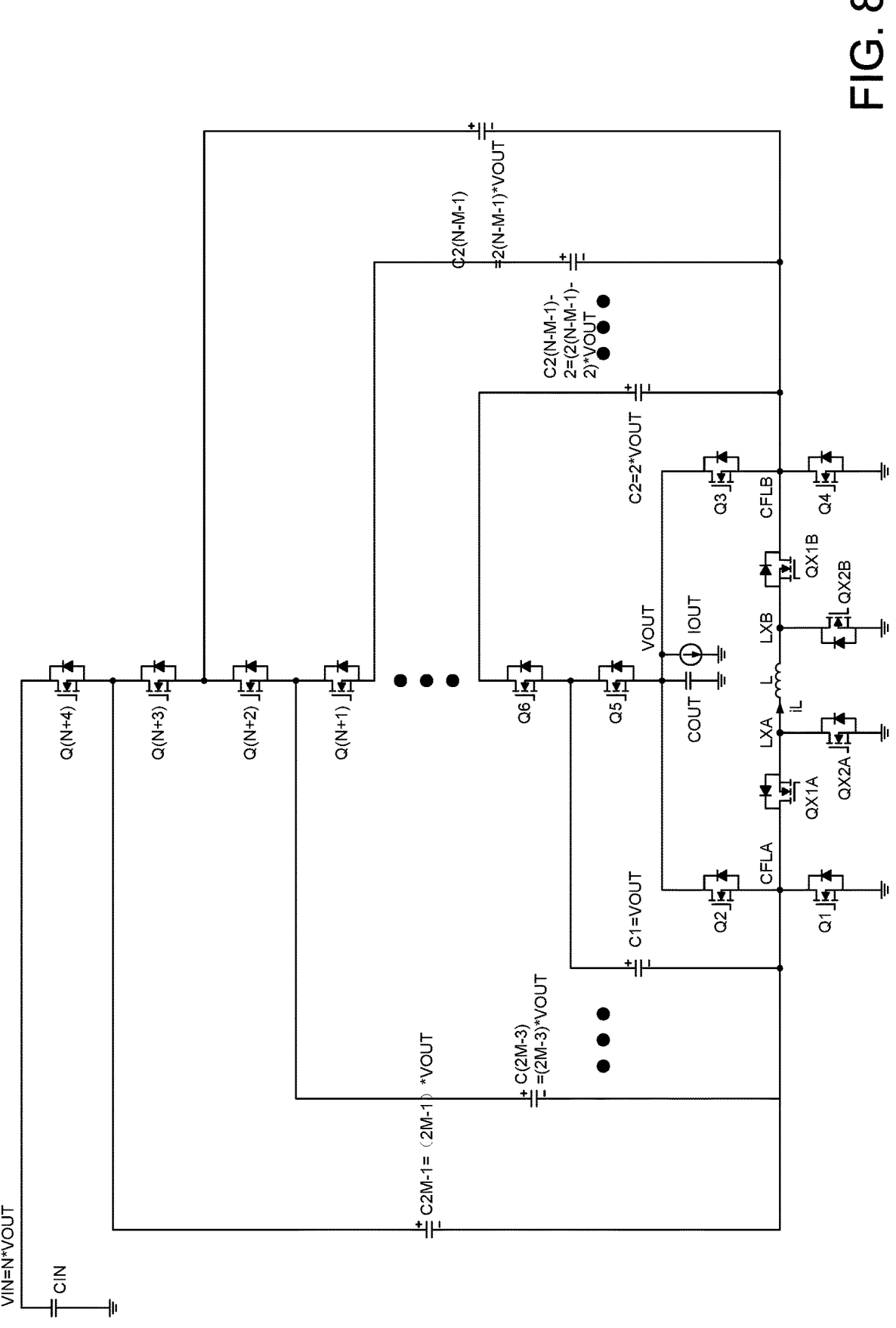
FIG. 8 is a schematic diagram showing a circuit structure of an N:1 ZVS switched capacitor converter of an embodiment of the present application.

Based on the 4:1 ZVS switched capacitor converter shown in FIG. 2, an N:1 ZVS switched capacitor converter can be realized by adding primary power transistors and capacitors, as shown in FIG. 8. An auxiliary circuit of the N:1 ZVS switched capacitor converter is same as that of the 4:1 ZVS switched capacitor converter as shown in FIG. 2, and a similar control method can be used in the N:1 ZVS switched capacitor converter to achieve all the primary power transistors turn on under zero voltage. The N is an integer greater than or equal to 3.

For example, a Dickson switched capacitor converter is an N:1 switched capacitor converter, the N:1 switched capacitor converter includes an auxiliary circuit, a first branch, a second branch, N common power transistors and N−1 capacitors, the first branch includes a first power transistor Q1 and a second power transistor Q2, the second branch includes a third power transistor Q3 and a fourth power transistor Q4, and the first power transistor Q1, the second power transistor Q2, the third power transistor Q3 and the fourth power transistor Q4 and the N common power transistors are primary power transistors.

A first terminal of the second power transistor Q2 and a first terminal of the third power transistor Q3 are connected to the output terminal of the N:1 switched capacitor converter, a second terminal of the second power transistor Q2 is connected to a first terminal of the first power transistor Q1 via a first node CFLA, a second terminal of the third power transistor Q3 is connected to a first terminal of the fourth power transistor Q4 via a second node CFLB, and a second terminal of the first power transistor Q1 and a second terminal of the fourth power transistor Q4 are grounded.

Both terminals of the auxiliary circuit are connected the first node CFLA and the second node CFLB respectively. A circuit structure of the auxiliary circuit of the N:1 switched capacitor converter shown in FIG. 8 is same as that of the auxiliary circuit of 4:1 switched capacitor converter shown in FIG. 2.

An input terminal of the N:1 switched capacitor converter is connected an external input voltage VIN, the input voltage VIN=N*VOUT, and the input terminal of the N:1 switched capacitor converter is connected to the output terminal of the N:1 switched capacitor converter through the N common power transistors in turn. The N common power transistors are connected in turn, each of the N−1 capacitors is corresponded to respective two adjacent common power transistors which are connected. For example, two adjacent common power transistors which are connected form a common power transistor pair, each capacitor is corresponded to a common power transistor pair, two adjacent common power transistor pairs include three power transistors and in that a middle power transistor is a shared power transistor of the two adjacent common power transistor pairs. A first terminal of each capacitor is connected between respective two adjacent common power transistors respectively, so that different capacitors are connected between two adjacent common power transistors of different common power transistor pairs respectively, a second terminal of a capacitor of any two adjacent capacitors which are connected the common power transistors is connected to the first node CFLA, and a second terminal of another capacitor of the two adjacent capacitors is connected to the second node CFLB.

If a second terminal of a capacitor, which is connected between a common power transistor connected the output terminal of the N:1 switched capacitor converter and anther common power transistor which is connected and adjacent to the common power transistor, is connected to the first node CLFA, there are M capacitors which are connected to the first node CFLA and N−M−1 capacitors which are connected to the second node CFLB, M=N/2 when N is an even number, and M=(N−1)/2 when N is an odd number.

For example, as shown in FIG. 8, the N common power transistors include a first common power transistor, a second common power transistor, . . . , a N−3-th common power transistor Q(N+1), a N−2-th common power transistor Q(N+2), a N−1-th common power transistor Q(N+3) and a N-th common power transistor Q(N+4), the first common power transistor is the fifth power transistor Q5, and the second common power transistor is the sixth power transistor Q6. The N−1 capacitors include a first capacitor C1, a second capacitor C2, a third capacitor C3, . . . , and a N−1-th capacitor C(N−1).

The input terminal of the N:1 switched capacitor converter is connected to the output terminal of the N:1 switched capacitor converter via the N-th common power transistor Q(N+4), the N−1-th common power transistor Q(N+3), the N−2-th common power transistor Q(N+2), the N−3-th common power transistor Q(N+1), . . . , the second common power transistor and the first common power transistor which are connected in turn respectively.

According to a sequence of the first capacitor C1, the second capacitor C2, the third capacitor C3, . . . , and the N−1-th capacitor C(N−1) in turn, a first terminal of the first capacitor C1 is connected between the first common power transistor and the second common power transistor, a first terminal of the second capacitor C2 is connected between the second common power transistor and the third common power transistor, a first terminal of the third capacitor C3 is connected between the third common power transistor and the fourth common power transistor, . . . , the N−1-th capacitor C(N−1) is connected between the N−1-th common power transistor Q(N+3) and the N-th common power transistor Q(N+4). When N is an even number, the N−1-th capacitor C(N−1) is a 2M−1-th capacitor C(2M−1) as shown in the FIG. 8, M=N/2, a first terminal of the 2M−1-th capacitor C(2M−1) is connected between the N-th common power transistor Q(N+4) and the N−1-th common power transistor Q(N+3). When N is an odd number, the N−1-th capacitor C(N−1) is a 2(N−M−1)-th capacitor C2(N−M−1) as shown in FIG. 8, M=(N−1)/2, a first terminal of the 2(N−M−1)-th capacitor C2(N−M−1) is connected between the N-th common power transistor Q(N+4) and the N−1-th common power transistor Q(N+3). Therefore, second terminals of the first capacitor C1, the third capacitor C3, . . . , the 2M−3-th capacitor C(2M−3) and the 2M−1-th capacitor C(2M−1) are connected to the first node CFLA respectively, second terminals of the second capacitor C2, . . . , the 2(N−M−1)−2-th capacitor C(2(N−M−1)−2) and the 2(N−M−1)-th capacitor C2(N−M−1) are connected to the second node CFLB respectively.

Voltage differences of the first capacitor C1, the second capacitor C2, the third capacitor C3, . . . , and the N−1-th capacitor C(N−1) are VOUT, 2VOUT, 3VOUT, . . . , (N−4)VOUT·(N−3)VOUT·(N−2)VOUT and (N−1)VOUT respectively.

In all embodiments of the present application, all power transistors in the first branch and the second branch are primary power transistors, and each primary power transistor has a parasitic capacitor.

In all embodiments of the present application, all the power transistors and all the common power transistors are switching transistors, for example, N-type switching transistor or P-type switching transistor.

The auxiliary circuit shown in FIG. 2 includes four NMOS and an inductor, and it can be realized that the electric charges at a node of one branch can be transferred to another branch by the auxiliary circuit during a dead time when all the primary power transistors are turned off, so as to realize zero voltage switching of all the primary power transistors and reducing switching loss. Besides the auxiliary circuit of FIG. 2, which can perform this function, various other circuits can also perform the function of the auxiliary circuit of FIG. 2, a variety of different auxiliary circuits is as shown in FIG. 9.

As shown in FIG. 9, the auxiliary circuit includes a ninth power transistor, a tenth power transistor, an eleventh power transistor, a twelfth power transistor and an inductor; a first terminal of the ninth power transistor is connected to the first node CFLA of the first branch, a second terminal of the ninth power transistor is connected to a first terminal of the tenth power transistor and a first terminal of the inductor, and a second terminal of the tenth power transistor is grounded; a second terminal of the inductor is connected to a first terminal of the eleventh power transistor and a first terminal of the twelfth power transistor, a second terminal of the eleventh power transistor is grounded, and a second terminal of the twelfth power transistor is connected to the second node CFLB of the second branch. When the ninth power transistor, the tenth power transistor, the eleventh power transistor and the twelfth power transistor are N-type power transistors, the auxiliary circuit is shown by an auxiliary ZVS circuit A of FIG. 9, when the ninth power transistor and the twelfth power transistor are P-type power transistors, and the tenth power transistor and the eleventh power transistor are N-type power transistors, the auxiliary circuit is shown by an auxiliary ZVS circuit D of FIG. 9

According to another embodiment of the present application, as shown in FIG. 9, the auxiliary circuit includes a ninth power transistor, a twelfth power transistor, a first diode, a second diode and an inductor; a first terminal of the ninth power transistor is connected to the first node CFLA of the first branch, a second terminal of the ninth power transistor is connected to a first terminal of the first diode and a first terminal of the inductor, a second terminal of the first diode is grounded, the first terminal of the first diode is a cathode, and the second terminal of the first diode is an anode; a second terminal of the inductor is connected to a first terminal of the second diode and a first terminal of the twelfth power transistor, a second terminal of the second diode is grounded, the first terminal of the second diode is a cathode, the second terminal of the second diode is an anode, and a second terminal of the twelfth power transistor is connected to the second node CFLB of the second branch. When the ninth power transistor and the twelfth power transistor are N-type power transistors, the auxiliary circuit is shown by an auxiliary ZVS circuit B of FIG. 9, when the ninth power transistor and the twelfth power transistor are P-type power transistors, the auxiliary circuit is shown by an auxiliary ZVS circuit E of FIG. 9.

According to another embodiment of the present application, as shown in FIG. 9, the auxiliary ZVS circuit includes a ninth power transistor, a twelfth power transistor and inductor, a first terminal of the ninth power transistor is connected to the first node CFLA of the first branch, a second terminal of the ninth power transistor is connected to a first terminal of the inductor, a second terminal of the inductor is connected to a first terminal of the twelfth power transistor, and a second terminal of the twelfth power transistor is connected to the second node CFLB of the second branch. When the ninth power transistor and the twelfth power transistor are N-type power transistors, the auxiliary ZVS circuit is shown by an auxiliary ZVS circuit C of FIG. 9, when the ninth power transistor and the twelfth power transistor are P-type power transistors, the auxiliary ZVS circuit is shown by an auxiliary ZVS circuit F of FIG. 9.

Since the specific implementation modes of the circuit structure are various, and the corresponding control methods are also various, they cannot be exemplified one by one in the present application, after those skilled in the art understand the contents of the present application, various modifications, variations or equivalents of the above described examples may be readily conceived, but still be controlled by the limitations set forth in the claims and any equivalents thereof.

13

14

What is claimed is:

1. A switched capacitor converter, comprising a first branch, a second branch, an auxiliary circuit, N common power transistors and N−1 capacitors, wherein N is an integer greater than or equal to 3;

the first branch comprises a first power transistor and a second power transistor, the second branch comprises a third power transistor and a fourth power transistor, a first terminal of the second power transistor and a first terminal of the third power transistor are connected to an output terminal of the switched capacitor converter, a second terminal of the second power transistor is connected to a first terminal of the first power transistor via a first node, a second terminal of the third power transistor is connected to a first terminal of the fourth power transistor via a second node, and a second terminal of the first power transistor and a second terminal of the fourth power transistor are grounded;

an input terminal of the switched capacitor converter is connected to the output terminal of the switched capacitor converter via the N common power transistors which are connected in turn, each of the N−1 capacitors is corresponded to two adjacent common power transistors of the N common power transistors and a terminal of the each of the N−1 capacitors is connected between the two adjacent common power transistors thereof, another terminal of one of any two adjacent capacitors of the N−1 capacitors is connected to the first node, and another terminal of another of the two adjacent capacitors is connected to the second node; and both terminals of the auxiliary circuit is connected to the first node and the second node respectively, the first power transistor, the second power transistor, the third power transistor, the fourth power transistor and the N common power transistors are primary power transistors, and the auxiliary circuit is configured to transfer, an electric charge or electric charges on one of the first node and the second node to another of the first node and the second node during a dead time when all the primary power transistors are turned off, so that a voltage difference at both terminals of each of the primary power transistors become zero, then the primary power transistors are turned on under zero voltage;

wherein the auxiliary circuit comprises a ninth power transistor, a tenth power transistor, an eleventh power transistor, a twelfth power transistor and an inductor;

a first terminal of the ninth power transistor is connected to the first node of the first branch, a second terminal of the ninth power transistor is connected to a first terminal of the inductor and a first terminal of the tenth power transistor, and a second terminal of the tenth power transistor is grounded; and a second terminal of the inductor is connected to a first terminal of the eleventh power transistor and a first terminal of the twelfth power transistor, a second terminal of the eleventh power transistor is grounded, and a second terminal of the twelfth power transistor is connected to the second node of the second branch.

2. The switched capacitor converter according to claim 1, wherein the N=4, the N common power transistors comprise a fifth power transistor, a sixth power transistor, a seventh power transistor and an eighth power transistor, and the N−1 capacitors comprise a first capacitor, a second capacitor and a third capacitor;

a first terminal of the eighth power transistor is the input terminal of the switched capacitor converter, the input terminal is connected to an external input voltage, and a second terminal of the eighth power transistor is connected to a first terminal of the seventh power transistor and a first terminal of the third capacitor;

a second terminal of the seventh power transistor is connected to a first terminal of the second capacitor and a first terminal of the sixth power transistor;

a second terminal of the sixth power transistor is connected to a first terminal of the first capacitor and a first terminal of the fifth power transistor;

a second terminal of the fifth power transistor is connected to the first terminal of the second power transistor and the first terminal of the third power transistor, and the second terminal of the fifth power transistor is also connected to the output terminal of the switched capacitor converter; and a second terminal of the first capacitor and a second terminal of the third capacitor are connected to the first node, a second terminal of the second capacitor is connected to the second node.

3. The switched capacitor converter according to claim 1, wherein N is an integer greater than or equal to 5, the N common power transistors comprise a first common power transistor, a second common power transistor, a third common power transistor, . . . , a N−3-th common power transistor, a N−2-th common power transistor, a N−1-th common power transistor and a N-th common power transistor, and the N−1 capacitors comprise a first capacitor, a second capacitor, a third capacitor, . . . , and a N−1-th capacitor;

the input terminal of the switched capacitor converter is connected to the output terminal of the switched capacitor converter via the N-th common power transistor, the N−1-th common power transistor, the N−2-th common power transistor, the N−3-th common power transistor, . . . , the second common power transistor and the first common power transistor which are connected in turn respectively; and a first terminal of the first capacitor is connected between the first common power transistor and the second common power transistor, a second terminal of the first capacitor is connected to the first node, a first terminal of the second capacitor is connected between the second common power transistor and the third common power transistor, and a second terminal of the second capacitor is connected to the second node, so M capacitors of the N−1 capacitors are connected to the first node, and N−M−1 capacitors of the N−1 capacitors are connected to the second node, wherein M=N/2 when N is an even number, and M=(N−1)/2 when N is an odd number.

4. The switched capacitor converter according to claim 3, wherein when N is an even number, the N−1-th capacitor is a 2M−1-th capacitor, a first terminal of the 2M−1-th capacitor is connected between the N-th common power transistor and the N−1-th common power transistor, and second terminals of the first capacitor, the third capacitor, . . . , and the 2M−1-th capacitor are connected to the first node respectively; and when N is an odd number, the N−1-th capacitor is a 2(N−M−1)-th capacitor, a first terminal of the 2(N−M−1)-th capacitor is connected between the N-th common power transistor and the N−1-th common power transistor, and second terminals of the second capacitor, . . . , and the 2(N–M–1)-th capacitor are connected to the second node respectively.

5. The switched capacitor converter according to claim 1, wherein a working sequence of the switched capacitor converter comprises four stages as follows:

a first stage: the second power transistor, the fourth power transistor, the sixth power transistor, the eighth power transistor, the tenth power transistor and the twelfth power transistor are turned on, and remaining power transistors are turned off; the external input voltage is configured to supply power to a load via the third capacitor, and simultaneously the first capacitor and the second capacitor are connected in series to supply power to the load, and the first capacitor is in a charging state, the second capacitor is in a discharging state, the third capacitor is in the charging state, and a current on the inductor is zero;

a second stage: the ninth power transistor and the twelfth power transistor are turned on, and remaining power transistors are turned off, the current on the inductor increases and then decreases until to zero, and the second stage ends when the current on the inductor decreases to zero;

a third stage: the first power transistor, the third power transistor, the fifth power transistor, the seventh power transistor, the ninth power transistor and the eleventh power transistor are turned on, and remaining power transistors are turned off; the first capacitor supplies power to the load, the first capacitor is in the discharging state, the second capacitor and the third capacitor are connected in series to supply power to the load, the second capacitor is in the charging state, the third capacitor is in the discharging state, and the current on the inductor is 0; and a fourth stage: the ninth power transistor and the twelfth power transistor are turned on, and remaining power transistors are turned off; the current on the inductor increases and then decreases until to zero, and the fourth stage ends when the current on the inductor decreases to zero, and returning to the first stage.

6. The switched capacitor converter according to claim 1, wherein the ninth power transistor, the tenth power transistor, the eleventh power transistor and the twelfth power transistor are N-type power transistors.

7. The switched capacitor converter according to claim 1, wherein the ninth power transistor and the twelfth power transistor are P-type power transistors, and the tenth power transistor and the eleventh power transistor are N-type power transistors.

8. A switched capacitor converter, comprising a first branch, a second branch, an auxiliary circuit, N common power transistors and N–1 capacitors, wherein N is an integer greater than or equal to 3;

the first branch comprises a first power transistor and a second power transistor, the second branch comprises a third power transistor and a fourth power transistor, a first terminal of the second power transistor and a first terminal of the third power transistor are connected to an output terminal of the switched capacitor converter, a second terminal of the second power transistor is connected to a first terminal of the first power transistor via a first node, a second terminal of the third power transistor is connected to a first terminal of the fourth power transistor via a second node, and a second terminal of the first power transistor and a second terminal of the fourth power transistor are grounded;

an input terminal of the switched capacitor converter is connected to the output terminal of the switched capacitor converter via the N common power transistors which are connected in turn, each of the N–1 capacitors is corresponded to two adjacent common power transistors of the N common power transistors and a terminal of the each of the N–1 capacitors is connected between the two adjacent common power transistors thereof, another terminal of one of any two adjacent capacitors of the N–1 capacitors is connected to the first node, and another terminal of another of the two adjacent capacitors is connected to the second node; and both terminals of the auxiliary circuit is connected to the first node and the second node respectively, the first power transistor, the second power transistor, the third power transistor, the fourth power transistor and the N common power transistors are primary power transistors, and the auxiliary circuit is configured to transfer, an electric charge or electric charges on one of the first node and the second node to another of the first node and the second node during a dead time when all the primary power transistors are turned off, so that a voltage difference at both terminals of each of the primary power transistors become zero, then the primary power transistors are turned on under zero voltage;

wherein the auxiliary circuit comprises a ninth power transistor, a tenth power transistor, an eleventh power transistor, a twelfth power transistor and an inductor;

a first terminal of the ninth power transistor is connected to the first node of the first branch, a second terminal of the ninth power transistor is connected to a first terminal of the inductor and a first terminal of the tenth power transistor, and a second terminal of the tenth power transistor is grounded; and a second terminal of the inductor is connected to a first terminal of the eleventh power transistor and a first terminal of the twelfth power transistor, a second terminal of the eleventh power transistor is grounded, and a second terminal of the twelfth power transistor is connected to the second node of the second branch.

9. The switched capacitor converter according to claim 8, wherein the ninth power transistor, the tenth power transistor, the eleventh power transistor and the twelfth power transistor are N-type power transistors.

10. The switched capacitor converter according to claim 8, wherein the ninth power transistor and the twelfth power transistor are P-type power transistors, and the tenth power transistor and the eleventh power transistor are N-type power transistors.

11. The switched capacitor converter according to claim 8, wherein the N=4, the N common power transistors comprise a fifth power transistor, a sixth power transistor, a seventh power transistor and an eighth power transistor, and the N–1 capacitors comprise a first capacitor, a second capacitor and a third capacitor;

a first terminal of the eighth power transistor is the input terminal of the switched capacitor converter, the input terminal is connected to an external input voltage, and a second terminal of the eighth power transistor is connected to a first terminal of the seventh power transistor and a first terminal of the third capacitor;

a second terminal of the seventh power transistor is connected to a first terminal of the second capacitor and a first terminal of the sixth power transistor;

a second terminal of the sixth power transistor is connected to a first terminal of the first capacitor and a first terminal of the fifth power transistor;

a second terminal of the fifth power transistor is connected to the first terminal of the second power transistor and the first terminal of the third power transistor, and the second terminal of the fifth power transistor is also connected to the output terminal of the switched capacitor converter; and a second terminal of the first capacitor and a second terminal of the third capacitor are connected to the first node, a second terminal of the second capacitor is connected to the second node.

12. The switched capacitor converter according to claim 8, wherein N is an integer greater than or equal to 5, the N common power transistors comprise a first common power transistor, a second common power transistor, a third common power transistor, . . . , a N−3-th common power transistor, a N−2-th common power transistor, a N−1-th common power transistor and a N-th common power transistor, and the N−1 capacitors comprise a first capacitor, a second capacitor, a third capacitor, . . . , and a N−1-th capacitor;

the input terminal of the switched capacitor converter is connected to the output terminal of the switched capacitor converter via the N-th common power transistor, the N−1-th common power transistor, the N−2-th common power transistor, the N−3-th common power transistor, . . . , the second common power transistor and the first common power transistor which are connected in turn respectively; and a first terminal of the first capacitor is connected between the first common power transistor and the second common power transistor, a second terminal of the first capacitor is connected to the first node, a first terminal of the second capacitor is connected between the second common power transistor and the third common power transistor, and a second terminal of the second capacitor is connected to the second node, so M capacitors of the N−1 capacitors are connected to the first node, and N−M−1 capacitors of the N−1 capacitors are connected to the second node, wherein M=N/2 when N is an even number, and M=(N−1)/2 when N is an odd number.

13. A switched capacitor converter, comprising a first branch, a second branch, an auxiliary circuit, N common power transistors and N−1 capacitors, wherein N is an integer greater than or equal to 3;

the first branch comprises a first power transistor and a second power transistor, the second branch comprises a third power transistor and a fourth power transistor, a first terminal of the second power transistor and a first terminal of the third power transistor are connected to an output terminal of the switched capacitor converter, a second terminal of the second power transistor is connected to a first terminal of the first power transistor via a first node, a second terminal of the third power transistor is connected to a first terminal of the fourth power transistor via a second node, and a second terminal of the first power transistor and a second terminal of the fourth power transistor are grounded;

an input terminal of the switched capacitor converter is connected to the output terminal of the switched capacitor converter via the N common power transistors which are connected in turn, each of the N−1 capacitors is corresponded to two adjacent common power transistors of the N common power transistors and a terminal of the each of the N−1 capacitors is connected between the two adjacent common power transistors thereof, another terminal of one of any two adjacent capacitors of the N−1 capacitors is connected to the first node, and another terminal of another of the two adjacent capacitors is connected to the second node; and both terminals of the auxiliary circuit is connected to the first node and the second node respectively, the first power transistor, the second power transistor, the third power transistor, the fourth power transistor and the N common power transistors are primary power transistors, and the auxiliary circuit is configured to transfer, an electric charge or electric charges on one of the first node and the second node to another of the first node and the second node during a dead time when all the primary power transistors are turned off, so that a voltage difference at both terminals of each of the primary power transistors become zero, then the primary power transistors are turned on under zero voltage;

wherein the auxiliary circuit comprises a ninth power transistor, a twelfth power transistor, a first diode, a second diode and an inductor;

a first terminal of the ninth power transistor is connected to the first node of the first branch, a second terminal of the ninth power transistor is connected to a first terminal of the first diode and a first terminal of the inductor, a second terminal of the first diode is grounded, the first terminal of the first diode is a cathode, and the second terminal of the first diode is an anode; and a second terminal of the inductor is connected to a first terminal of the second diode and a first terminal of the twelfth power transistor, a second terminal of the second diode is grounded, the first terminal of the second diode is a cathode, the second terminal of the second diode is an anode, and a second terminal of the twelfth power transistor is connected to the second node of the second branch.

14. The switched capacitor converter according to claim 13, wherein the ninth power transistor and the twelfth power transistor are N-type power transistors or P-type power transistors.

15. The switched capacitor converter according to claim 13, wherein the N=4, the N common power transistors comprise a fifth power transistor, a sixth power transistor, a seventh power transistor and an eighth power transistor, and the N−1 capacitors comprise a first capacitor, a second capacitor and a third capacitor;

a first terminal of the eighth power transistor is the input terminal of the switched capacitor converter, the input terminal is connected to an external input voltage, and a second terminal of the eighth power transistor is connected to a first terminal of the seventh power transistor and a first terminal of the third capacitor;

a second terminal of the seventh power transistor is connected to a first terminal of the second capacitor and a first terminal of the sixth power transistor;

a second terminal of the sixth power transistor is connected to a first terminal of the first capacitor and a first terminal of the fifth power transistor;

a second terminal of the fifth power transistor is connected to the first terminal of the second power transistor and the first terminal of the third power transistor, and the second terminal of the fifth power transistor is also connected to the output terminal of the switched capacitor converter; and a second terminal of the first capacitor and a second terminal of the third capacitor are connected to the first node, a second terminal of the second capacitor is connected to the second node.

16. The switched capacitor converter according to claim 13, wherein N is an integer greater than or equal to 5, the N common power transistors comprise a first common power transistor, a second common power transistor, a third common power transistor, . . . , a N–3-th common power transistor, a N–2-th common power transistor, a N–1-th common power transistor and a N-th common power transistor, and the N–1 capacitors comprise a first capacitor, a second capacitor, a third capacitor, . . . , and a N–1-th capacitor.

17. A switched capacitor converter, comprising a first branch, a second branch, an auxiliary circuit, N common power transistors and N–1 capacitors, wherein N is an integer greater than or equal to 3;

the first branch comprises a first power transistor and a second power transistor, the second branch comprises a third power transistor and a fourth power transistor, a first terminal of the second power transistor and a first terminal of the third power transistor are connected to an output terminal of the switched capacitor converter, a second terminal of the second power transistor is connected to a first terminal of the first power transistor via a first node, a second terminal of the third power transistor is connected to a first terminal of the fourth power transistor via a second node, and a second terminal of the first power transistor and a second terminal of the fourth power transistor are grounded;

an input terminal of the switched capacitor converter is connected to the output terminal of the switched capacitor converter via the N common power transistors which are connected in turn, each of the N–1 capacitors is corresponded to two adjacent common power transistors of the N common power transistors and a terminal of the each of the N–1 capacitors is connected between the two adjacent common power transistors thereof, another terminal of one of any two adjacent capacitors of the N–1 capacitors is connected to the first node, and another terminal of another of the two adjacent capacitors is connected to the second node; and both terminals of the auxiliary circuit is connected to the first node and the second node respectively, the first power transistor, the second power transistor, the third power transistor, the fourth power transistor and the N common power transistors are primary power transistors, and the auxiliary circuit is configured to transfer, an electric charge or electric charges on one of the first node and the second node to another of the first node and the second node during a dead time when all the primary power transistors are turned off, so that a voltage difference at both terminals of each of the primary power transistors become zero, then the primary power transistors are turned on under zero voltage;

wherein the auxiliary circuit comprises a ninth power transistor, a twelfth power transistor and an inductor;

a first terminal of the ninth power transistor is connected to the first node of the first branch, and a second terminal of the ninth power transistor is connected to a first terminal of the inductor; and a second terminal of the inductor is connected to a first terminal of the twelfth power transistor, and a second terminal of the twelfth power transistor is connected to the second node of the second branch.

18. The switched capacitor converter according to claim 17, wherein the ninth power transistor and the twelfth power transistor are N-type power transistors or P-type power transistors.

19. The switched capacitor converter according to claim 17, wherein the N=4, the N common power transistors comprise a fifth power transistor, a sixth power transistor, a seventh power transistor and an eighth power transistor, and the N–1 capacitors comprise a first capacitor, a second capacitor and a third capacitor;

a first terminal of the eighth power transistor is the input terminal of the switched capacitor converter, the input terminal is connected to an external input voltage, and a second terminal of the eighth power transistor is connected to a first terminal of the seventh power transistor and a first terminal of the third capacitor;

a second terminal of the seventh power transistor is connected to a first terminal of the second capacitor and a first terminal of the sixth power transistor;

a second terminal of the sixth power transistor is connected to a first terminal of the first capacitor and a first terminal of the fifth power transistor;

a second terminal of the fifth power transistor is connected to the first terminal of the second power transistor and the first terminal of the third power transistor, and the second terminal of the fifth power transistor is also connected to the output terminal of the switched capacitor converter; and a second terminal of the first capacitor and a second terminal of the third capacitor are connected to the first node, a second terminal of the second capacitor is connected to the second node.

20. The switched capacitor converter according to claim 17, wherein N is an integer greater than or equal to 5, the N common power transistors comprise a first common power transistor, a second common power transistor, a third common power transistor, . . . , a N–3-th common power transistor, a N–2-th common power transistor, a N–1-th common power transistor and a N-th common power transistor, and the N–1 capacitors comprise a first capacitor, a second capacitor, a third capacitor, . . . , and a N–1-th capacitor;

the input terminal of the switched capacitor converter is connected to the output terminal of the switched capacitor converter via the N-th common power transistor, the N–1-th common power transistor, the N–2-th common power transistor, the N–3-th common power transistor, . . . , the second common power transistor and the first common power transistor which are connected in turn respectively; and a first terminal of the first capacitor is connected between the first common power transistor and the second common power transistor, a second terminal of the first capacitor is connected to the first node, a first terminal of the second capacitor is connected between the second common power transistor and the third common power transistor, and a second terminal of the second capacitor is connected to the second node, so M capacitors of the N–1 capacitors are connected to the first node, and N–M–1 capacitors of the N–1 capacitors are connected to the second node, wherein M=N/2 when N is an even number, and M=(N–1)/2 when N is an odd number, the input terminal of the switched capacitor converter is connected to the output terminal of the switched capacitor converter via the N-th common power transistor, the N–1-th common power transistor, the N–2-th common power transistor, the N–3-th common power transistor, . . . , the second common power transistor and the first common power transistor which are connected in turn respectively; and a first terminal of the first capacitor is connected between the first common power transistor and the second common power transistor, a second terminal of the first capacitor is connected to the first node, a first terminal of the second capacitor is connected between the second common power transistor and the third common power transistor, and a second terminal of the second capacitor is connected to the second node, so M capacitors of the N–1 capacitors are connected to the first node, and N–M–1 capacitors of the N–1 capacitors are connected to the second node, wherein M=N/2 when N is an even number, and M=(N–1)/2 when N is an odd number.

* * * * *